US012197577B2

(12) United States Patent
Chen et al.

(10) Patent No.: US 12,197,577 B2
(45) Date of Patent: *Jan. 14, 2025

(54) MALICIOUS JS DETECTION BASED ON AUTOMATED USER INTERACTION EMULATION

(71) Applicant: Palo Alto Networks, Inc., Santa Clara, CA (US)

(72) Inventors: Jin Chen, San Jose, CA (US); Tao Yan, San Jose, CA (US); Taojie Wang, San Jose, CA (US); Bo Qu, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,835

(22) Filed: Dec. 11, 2023

(65) Prior Publication Data

US 2024/0104210 A1    Mar. 28, 2024

Related U.S. Application Data

(63) Continuation of application No. 17/517,262, filed on Nov. 2, 2021, now Pat. No. 11,874,924.

(51) Int. Cl.
*G06F 21/53* (2013.01)
*G06F 21/56* (2013.01)

(52) U.S. Cl.
CPC .......... *G06F 21/566* (2013.01); *G06F 21/53* (2013.01); *G06F 2221/033* (2013.01)

(58) Field of Classification Search
CPC ... G06F 21/566; G06F 21/53; G06F 2221/033

USPC .......................................... 726/23
See application file for complete search history.

(56) References Cited

U.S. PATENT DOCUMENTS

| | | | | |
|---|---|---|---|---|
| 9,178,901 | B2* | 11/2015 | Xue | H04L 63/1483 |
| 11,423,146 | B2* | 8/2022 | Li | G06F 18/2413 |
| 11,838,300 | B1* | 12/2023 | Vashisht | H04L 63/1416 |
| 11,841,947 | B1* | 12/2023 | Saxe | G06N 3/04 |
| 12,010,129 | B2* | 6/2024 | Voros et al. | H04L 63/20 |
| 2014/0317741 | A1* | 10/2014 | Be'Ery | H04L 63/16 |
| | | | | 726/23 |
| 2017/0195353 | A1* | 7/2017 | Taylor | H04L 63/1425 |
| 2018/0288063 | A1* | 10/2018 | Koottayi | G06F 21/50 |
| 2020/0311268 | A1* | 10/2020 | Kostyushko | G06F 21/561 |
| 2021/0203690 | A1* | 7/2021 | Nunes | G06N 3/088 |
| 2021/0314353 | A1* | 10/2021 | Melson | H04L 67/02 |
| 2021/0385245 | A1* | 12/2021 | Melson | H04L 63/1433 |

(Continued)

FOREIGN PATENT DOCUMENTS

KR    101725395    4/2017

OTHER PUBLICATIONS

Md. Fahimuzzman Sohan; A Systematic Literature Review and Quality Analysis of Javascript Malware Detection; IEEE:2020; pp. 190539-190552.*

(Continued)

*Primary Examiner* — Monjur Rahim
(74) *Attorney, Agent, or Firm* — Van Pelt, Yi & James LLP

(57) ABSTRACT

Detection of malicious JavaScript based on automated user interaction emulation is disclosed. A malware sample is executed in an instrumented virtual environment. Dynamic behavior is triggered based on emulated user interactions.

9 Claims, 18 Drawing Sheets

(56) References Cited

U.S. PATENT DOCUMENTS

2022/0070219 A1* 3/2022 Bryzgin ............. H04L 63/1491
2023/0096108 A1* 3/2023 Malanov ............... G06F 21/554
 726/22

OTHER PUBLICATIONS

Kolbitsch et al., "Rozzle: De-cloaking Internet Malware," 2012 IEEE Symposium on Security and Privacy, San Francisco, CA, pp. 443-457, 2012.

* cited by examiner

```
g_rooturl = 'http://_pan.furnace.com/
?checkout=1&payment=1&onepage=1&billi
ng=1';
var page = await g_browser.newPage();
page.on("request", async (req) => {
   if(url==g_rooturl){
      var code = page.code;
   }
   ...
   req.respond({
        state: 200,
        contentType: 'text/html',
        body: code
   });
}
await page.goto(g_rooturl);
```

Figure 6B

```
keyword_value_array = Object.entries(g_payment_keyword_to_value);
g_payment_input_elements = keyword_value_array.map(x =>
create_payment_element('input',x, true));
g_payment_textarea_elements = keyword_value_array.map(x =>
create_payment_element('textarea',x));
g_payment_option_elements = keyword_value_array.map(x =>
create_payment_element('option',x));
...
let button_keywords=["checkout","order","pay","submit","save"];
for(let i of button_keywords){
    let button = document.createElement("button");
}
```

Figure 7B

```
let g_visa = "5432123456788881"; //
    checksum should be right, check "mod 10"
    algorithm
let g_payment_keyword_to_value= {
    "payment_checkout1": g_visa,
    "payment_checkout2": "2030",
    "payment_checkout3": "12",
    "payment_checkout4": "123",
    "cardNumber": g_visa,
    "billing_firstname":"pan",
    "billing_lastname":"pan",
    "cardcode":"123",
    "exprmo":"12",
    "expiry_month":"12",
    "expiry_year": "2030",
    "expryr":"2030",
    "ccsave_cc_number":g_visa,
    "ccsave_cc_owner":"pan",
    "ccsave_expiration": "12",
```

Figure 8B

```
function new_addEventListener(etype, listener){
    if(g_addEventListener_lock==0){
        g_addEventListener_lock=1;
        if(this==document||this==window){
            g_payment_input_elements[0].click();
        }else{
            this.click();
        }
        g_addEventListener_lock=0;
    }
}
else if(etype=='change'){
    if(g_addEventListener_lock==0){
    g_addEventListener_lock=1;
    if(this.value){
        this.value=this.value+" ";
    }
    g_addEventListener_lock=0;
```

Figure 9B

```
function new_setTimeout(func, milliseconds){
    ...
    let funcbody = func.toString();
    if(called_funclist.indexOf(funcbody)==-1){
    called_funclist.push(funcbody);
    } return g_original_setTimeout(func, 1);
}
```

Figure 9C

```
if(jscode.indexOf("Bootstrap's
JavaScript requires ")!=-1){
    jqueryjs = g_jqueryjs2_0_0;
}
else{
    jqueryjs = g_jqueryjs3_5_1;
} if(jscode.indexOf("var
Prototype={Version")!=-1){
    jqueryjs += "\n\nvar
jQuery=$;jQuery.noConflict();";
}
```

Figure 10B

MALICIOUS JS DETECTION BASED ON AUTOMATED USER INTERACTION EMULATION

CROSS REFERENCE TO OTHER APPLICATIONS

This application is a continuation of U.S. patent application Ser. No. 17/517,262, entitled MALICIOUS JS DETECTION BASED ON AUTOMATED USER INTERACTION EMULATION filed Nov. 2, 2021 which is incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. As techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 6B illustrates an example of JavaScript code for executing a malware sample in a forged URL path.

FIG. 7B illustrates an example of JavaScript code for creating a required DOM element with class and ID.

FIG. 8B illustrates an example of JavaScript code for guaranteeing that a correct value for a DOM element.

FIG. 9B illustrates an example of JavaScript code for hooking a function and triggering an event.

FIG. 9C illustrates an example of JavaScript code for reducing a time out of a malware sample.

FIG. 10B illustrates an example of JavaScript code for loading required libraries.

DETAILED DESCRIPTION

Figure 1:
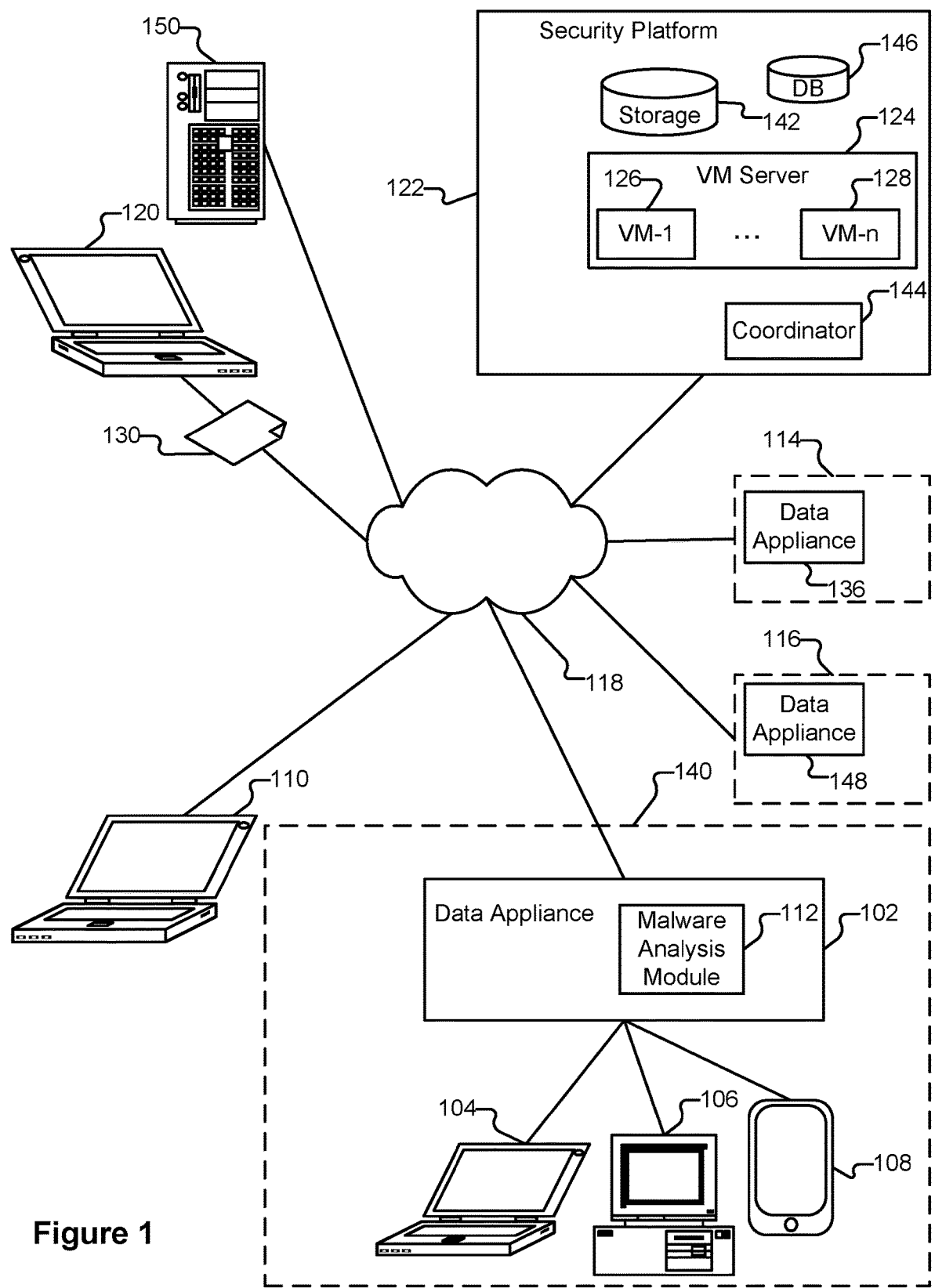
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, to detect malicious JavaScript (JS) code of a sample, there are two ways to detect malicious JS code, static analysis and dynamic analysis. In static analysis, malicious code patterns are used to detect malicious JS code based on a pattern matching technique. In dynamic analysis, the behavior of the sample is recorded while executing the JS code in an instrumented virtual environment, and then analyzing the recorded behavior to determine whether the sample is malicious.

The pattern matching technique of static analysis can be limited because encoding, obfuscation, and encryption are techniques that can be used to bypass it.

In some embodiments, the dynamic analysis is limited in its behavior analysis because certain malicious behavior is uncovered only after specific conditions related to user interactions are met, so it is difficult to uncover all behaviors of the sample. Examples of the specific conditions include the malicious behavior is performed only if the sample is run in a specific or special uniform resource locator (URL) path, only if a correct value is input in one or more required Document Object Model (DOM) elements, only if one or more required Document Object Model (DOM) elements exist with a specific claim name and identifier, only if the sample is run after a specific or special event is triggered, and/or one or more required JavaScript (JS) libraries are available. As an example, a malicious sample will proceed to capture credit card information from a payment dialog box (input form) or steal password information (username/password) from a login screen and send the captured information to a server only after a submit button is depressed or a login button is depressed. Typically, dynamic analysis does not perform the depressing of the submit button or the login button, so the capturing of the information is never performed in the malware analysis sandbox. Also, auto fill can be a challenge for dynamic analysis.

The present application describes an automated user interaction emulation engine that emulates user interactions to trigger dynamic behavior. In some embodiments, the sample is executed in a browser (the malicious JS code is executed in a customized browser engine (Chrome headless)), which emulates the user interactions to trigger the dynamic behavior. Examples of the emulated user interactions include triggering the dynamic behavior by executing within a customized URL path, inputting a correct value to one or more DOM elements, providing a customized DOM element, providing a customized special event, and/or providing a customized JS library.

In some embodiments, a system/method/computer program product for detecting malicious JavaScript based on automated user interaction emulation includes executing a malware sample in an instrumented virtual environment; and triggering the dynamic behavior based on emulated user interactions.

In some embodiments, the triggering of the dynamic behavior includes performing one or more of the following: a uniform resource locator (URL) path check, a dome element check, an input value check, a special event trigger, and/or a library dependency check.

In some embodiments, the triggering of the dynamic behavior comprises to perform a uniform resource locator (URL) path check comprising to: determine that the malware sample requires being executed in a special URL path before triggering the dynamic behavior; and execute the malware sample in a customized specialized URL path that corresponds with the special URL path.

In some embodiments, the triggering of the dynamic behavior comprises to perform a dome element check comprising to: determine that the malware sample requires one or more DOM elements to exist in a webpage before triggering the dynamic behavior; and create the one or more required DOM elements before executing the malware sample.

In some embodiments, the triggering of the dynamic behavior comprises to perform an input value check comprising to: determine that the malware sample requires a correct value of one or more DOM elements before triggering the dynamic behavior; and create a correct value for the one or more DOM elements before executing the malware sample.

In some embodiments, the triggering of the dynamic behavior comprises to perform a special event trigger comprising to: determine that a special event is triggered before triggering the dynamic behavior; and hook an event handler to trigger the special event in the event that the malware sample adds the event handler before executing the malware sample.

In some embodiments, the triggering of the dynamic behavior comprises to perform a special event trigger comprising to: determine that a timer event is triggered before triggering the dynamic behavior; and reduce a time out of a timer mechanism for the malware sample to allow the malware sample to be executed sooner before executing the malware sample.

In some embodiments, the triggering of the dynamic behavior comprises to perform a library dependency check comprising to: determine that the malware sample requires one or more javascript libraries before triggering the dynamic behavior; and loading the one or more required javascript libraries before executing the malware sample.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware).

Techniques described herein can be used in conjunction with a variety of platforms (e.g., desktops, mobile devices, gaming platforms, embedded systems, etc.) and/or a variety of types of applications across a variety of CPU architectures (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
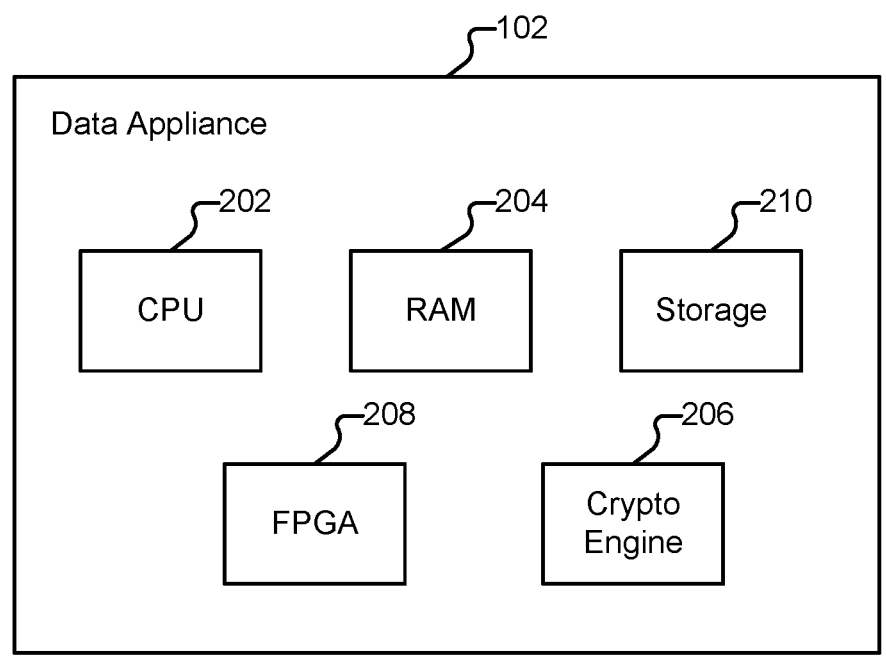
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
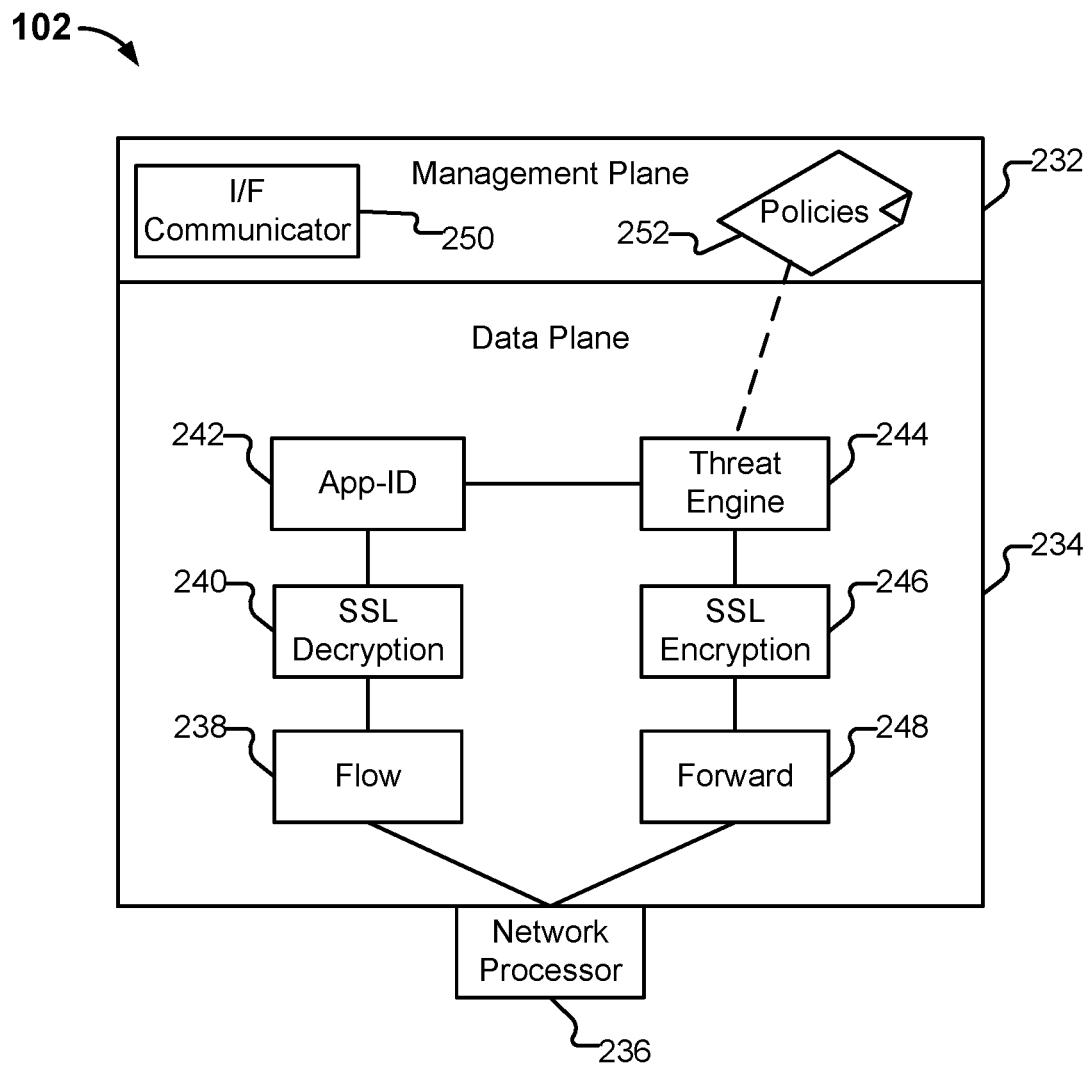
FIG. 2B is a functional diagram of logical components in an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (UF) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. An alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, in various embodiments, security platform 122 performs static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel-based Virtual Machine (KVM), VMware ESXi, Citrix XenServer, and Microsoft Hyper-V. Custom virtualization software can also be used and/or the functionality of commercially available virtualization software extended as needed to support various functionality described herein (e.g., as being provided by a hypervisor). Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
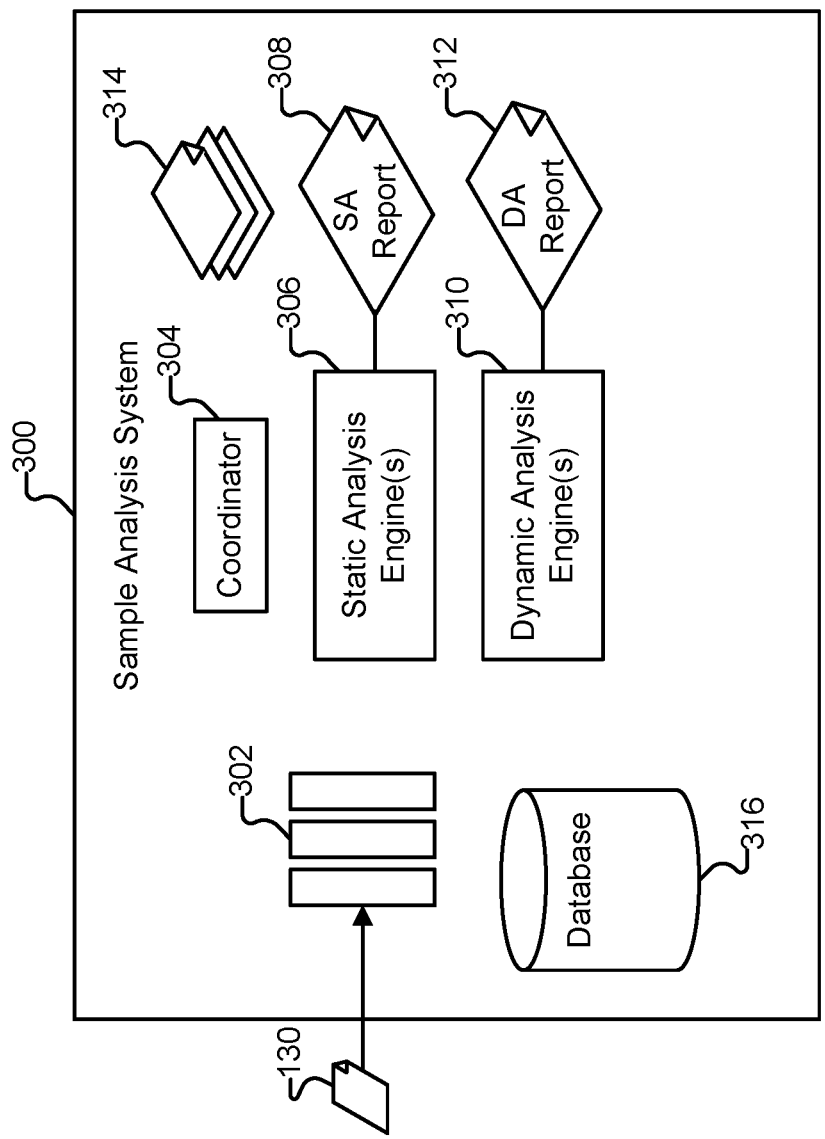
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122, or as a separate device located within network 140 and in communication with data appliance 102 (e.g., comprising various applicable components described herein as being provided by security platform 122, such as virtual machine server 124).

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain) As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static analysis report information can be used to help select/customize/configure the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Simulating User Interactions for Malware Analysis

Malware authors are using increasingly sophisticated techniques when crafting their malware so that it evades detection by security analysis systems. One such technique is to have the malware attempt to determine whether it is executing in a virtual machine environment, and if so, to refrain from executing or otherwise not engage in malicious activities. By doing so, a security analysis system may erroneously conclude that the malware sample is benign because it is not observed by the security analysis system to engage in malicious behavior during dynamic analysis. As will be described in more detail below, in various embodiments, platform 122 and/or data appliance 102, or other component or components, as applicable, make use of techniques to help thwart detection by malware samples that they are being executed in virtualized environments. By preventing malware samples from determining that they are being executed in virtualized environments, successful detection of the samples as being malicious is more likely to occur as the malware samples will more likely engage in malicious behavior while being executed in the virtualized environment.

One way that malware can determine whether it is executing in a virtual machine environment is by looking for indicia that it is being manipulated/executed by the guest operating system. As an example, in a typical virtualized environment, a sample to be tested (e.g., sample 130) might be renamed (e.g., from its original name as observed by data appliance 102) to a default name, such as "sample.exe." A script (e.g., "autoexec.bat") will automatically be executed at startup by the guest operating system and directly launch or cause the launching of the sample (e.g., by a dynamic analysis helper tool). Since the malware sample and dynamic analysis help script/tools are all collocated within the user space of the guest OS, the presence of the dynamic analysis script/tools on the guest OS will be visible to the malware, as will information such as that the malware was started by the script (or tool) and/or that the malware has been renamed. Further, the dynamic analysis helper tool may make use of OS API calls (e.g., instructing the operating system to take various actions such as keyboard entry). Use of those API calls by the dynamic analysis helper tool can be observed by the malware. If the executing sample determines that it is being executed in a virtualized environment, it can refrain from engaging in malicious actions and evade being flagged as malicious by a dynamic analysis system.

Another way that malware can determine whether it is executing in a virtual machine environment is by looking for indicia that a human is interacting with the system on which the malware is executing. If a human does not appear to be interacting with the system, the malware may refrain from engaging in malicious actions. As one example, a malicious document may only engage in malicious behavior after a certain set of actions has been taken within the word processing application used to launch the malicious document (e.g., scrolling down four pages using a mouse, or performing a certain number of mouse clicks). As another example, a malicious spreadsheet comprising multiple worksheets may refrain from taking malicious actions until each worksheet has been clicked on with a mouse.

Some virtualized dynamic analysis environments may attempt to replicate user behavior through scripting/hooks (e.g., using guest OS API calls to press keyboard keys or move the position of the mouse). However, increasingly sophisticated malware is aware of when such OS API calls are used and can thus detect such interactions as being automatically generated by a dynamic analysis system instead of being made by a human end user. As such, malicious documents may require more complex indicia of human use that does not lend itself to scripting (e.g., scrolling down four pages using a mouse, performing a certain number of mouse clicks, etc.) before exhibiting malicious behavior.

A. Example Environment

Figure 4:
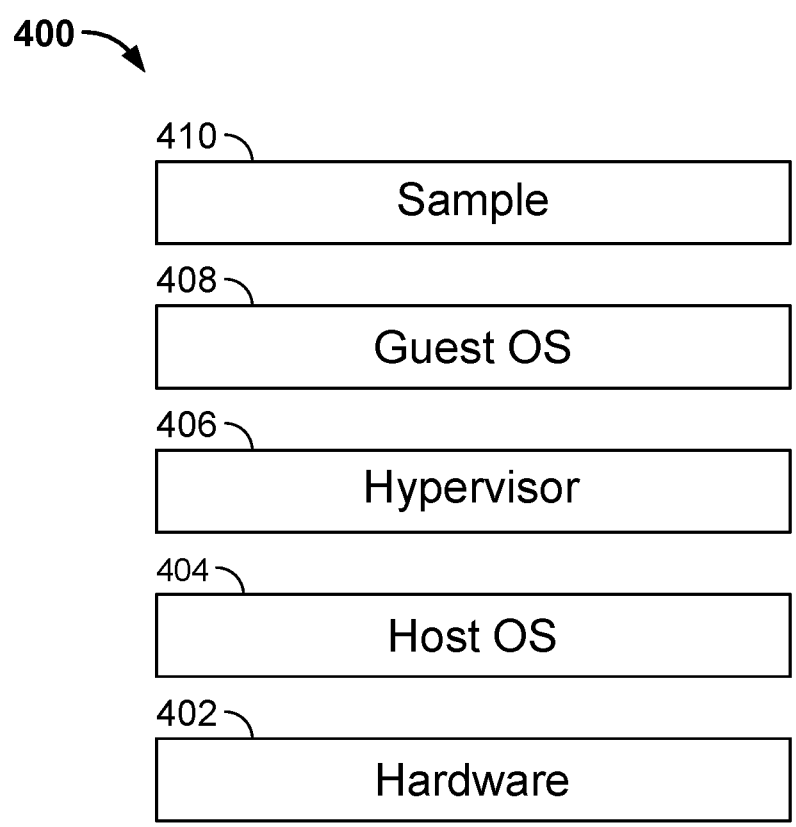
FIG. 4 illustrates an embodiment of an environment for analyzing malware samples.

FIG. 4 illustrates an embodiment of an environment for analyzing malware samples. Environment 400 is an example of components that can be included in system 300 (e.g., as dynamic analysis engine 310). In the example shown in FIG. 4, a dynamic analyzer host OS (404), such as Ubuntu for x86_64, runs on appropriate hardware (402), such as Intel x86 or x86_64 based hardware. A hypervisor (406) runs a virtual machine that has a guest OS (408) of a type appropriate for the sample being analyzed (e.g., 64-bit Windows 7 SP 2 or MacOS X) and, as applicable, various applications pre-installed (e.g., Microsoft Office, Adobe Acrobat, Mozilla Firefox, Safari, etc.).

As previously mentioned, when performing dynamic analysis in a virtualized environment, one approach is for sample 410 to be launched by a script or tool executing within guest OS 408. For example, a helper tool installed on guest OS 408 can rely on Windows APIs to detect message boxes and new items on the desktop, perform keyboard presses and movements, etc. However, as mentioned above, one drawback of this approach is that it can allow the malware to detect that it is executing in/manipulated by guest OS 408 and cause it to refrain from exhibiting malicious behaviors to evade detection.

An alternate approach (used by various embodiments of security platform 122, malware analysis module 112, sample analysis system 300, etc.) does not rely on the guest OS to simulate user actions, but instead uses hypervisor 406. In particular, and as will be described in more detail below, frame buffer data stored by the graphics card is directly accessed by the hypervisor to generate screenshots of the virtualized system's desktop for analysis, and device drivers such as the mouse device driver are hooked so that the hypervisor can move the virtualized mouse directly, as an end user would, without making guest OS API calls. Since guest OS API calls are not used to simulate human activity, the malware sample (410) will be unable to detect that it is running in a virtualized environment and thus will not conceal its malicious behavior during analysis.

VI. Analyzing Malware Samples

Figure 5A:
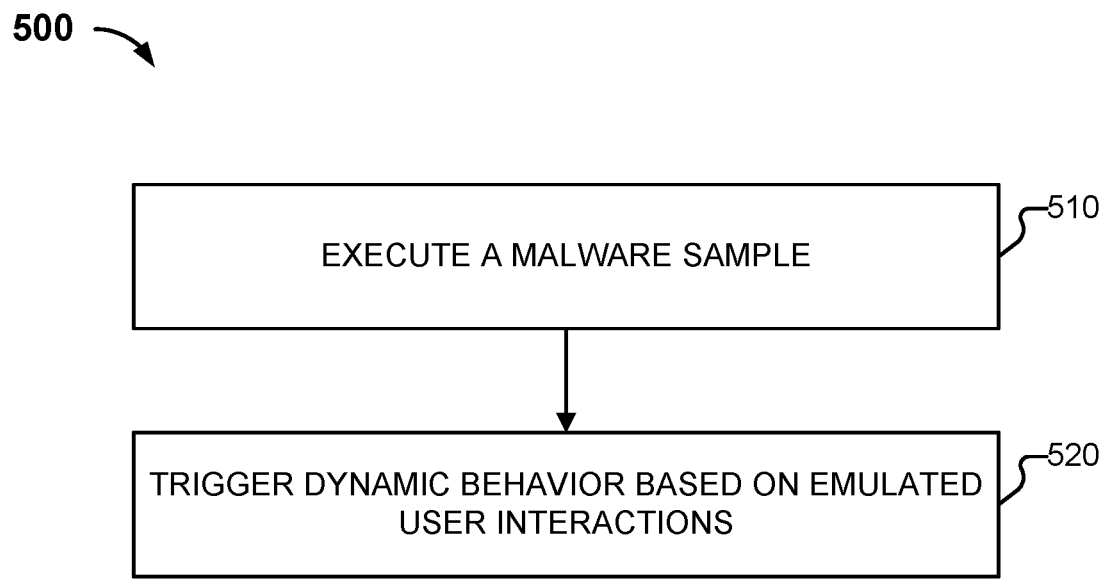
FIG. 5A illustrates an embodiment of a process for analyzing malware samples.

FIG. 5A illustrates an embodiment of a process for analyzing malware samples. In some embodiments, the process 500 is performed using environment 400 of FIG. 4 and comprises:

In 510, the environment executes a malware sample. In some embodiments, the environment is an instrumented virtual environment.

In 520, the environment triggers dynamic behavior based on emulated user interactions.

Typically, when the malware sample is executed, a limited amount of information can be gained from conventional dynamic analysis of the malware sample because the malware sample is awaiting a user interaction before further executing. In the event that the malware sample receives the user interaction, the malware sample can execute dynamic behaviors that can be observed to allow the malware sample to be detected. An example of a user interaction can include a user entering in a valid credit card number and clicking a submit button to trigger malicious behavior. Subsequently, all of the dynamic behaviors can be stored for further analysis to identify additional malicious behaviors.

In some embodiments, the emulated user interactions include providing a customized uniform resource locator (URL) path, a customized Document Object Model (DOM) element, a customized input value, a customized special event, and/or a customized library.

Figure 5B:
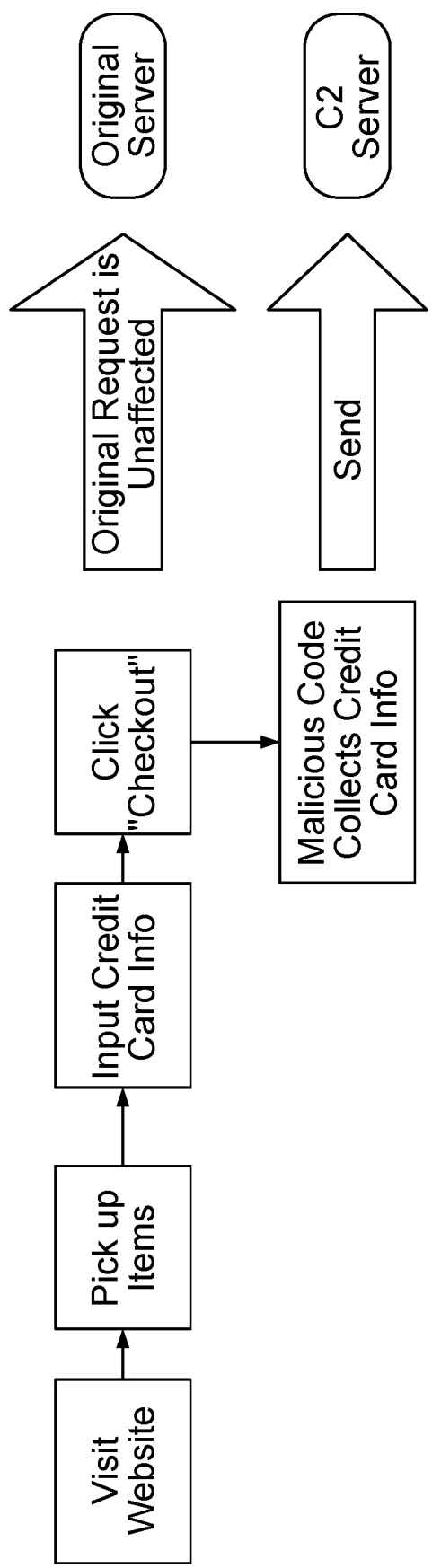
FIG. 5B illustrates an example of a flow associated with a malware sample.

FIG. 5B illustrates an example of a flow associated with a malware sample.

Using a formjacking sample as an example of a malware sample, the formjacking sample performs a plurality of checks before triggering the dynamic behavior such as, for example, stealing credit card information. As an example, the plurality of checks includes a specific uniform resource locator (URL) check, a Document Object Model (DOM) element check, an input value check, a special event trigger check, and a library dependency check.

In the example of the flow associated with the malware sample, a user visits a website, which has been hijacked by the malware sample, adds one or more items to their shopping cart, proceeds to the checkout, inputs their credit card information, and clicks "checkout." In the example, subsequently, upon clicking checkout, two things occur: malicious code of the formjacking sample collects the inputted credit card information and sends the collected credit card information to a server associated with the formjacking sample, and also the original request to checkout is unaffected and sent to the original destination server.

Figure 6A:
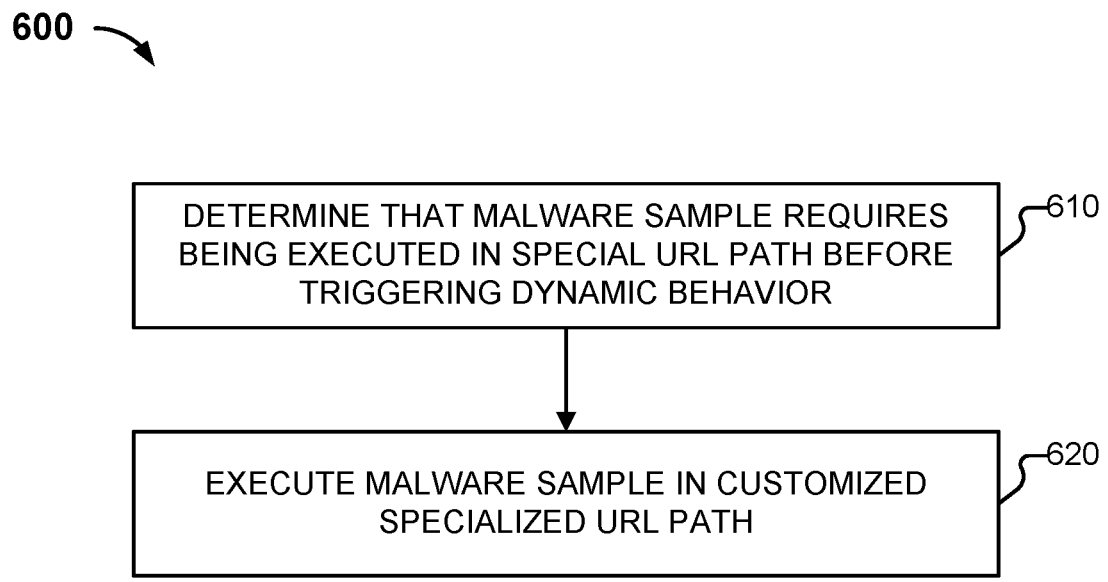
FIG. 6A illustrates an embodiment of a process for performing a uniform resource locator (URL) path check.

FIG. 6A illustrates an embodiment of a process for performing a uniform resource locator (URL) path check. In some embodiments, the process 600 is an implementation of operation 520 of FIG. 5A and includes:

In 610, the environment determines that the malware sample requires being executed in a special URL path before triggering the dynamic behavior.

In 620, the environment executes the malware sample in a customized specialized URL path that corresponds with the special URL path.

FIG. 6B illustrates an example of JavaScript code for executing a malware sample in a forged URL path.

As an example, malicious JS code of the malware sample requires the malware sample to be executed in a special URL path. The special URL path requires a "onepage" string to be in the special URL path before triggering the dynamic behavior from the malware sample. Accordingly, the malware sample is executed using a customized specialized URL path that includes the "onepage" string.

When preparing to execute the malware sample, the environment forges a URL path which includes the "onepage" string. As shown in the JavaScript code, when the malware sample is executed, the forged URL path includes the "onepage" string, so dynamic behaviors of the malware sample are triggered. Examples of dynamic behavior include hooking a function to monitor the input data, sending the sensitive input data to a collection server, and/or other malicious behavior. Also, the forged URL path includes the "checkout" string, the "payment" string, and the "billing" string for malware samples that look for other keywords in the URL path when being executed.

Figure 7A:
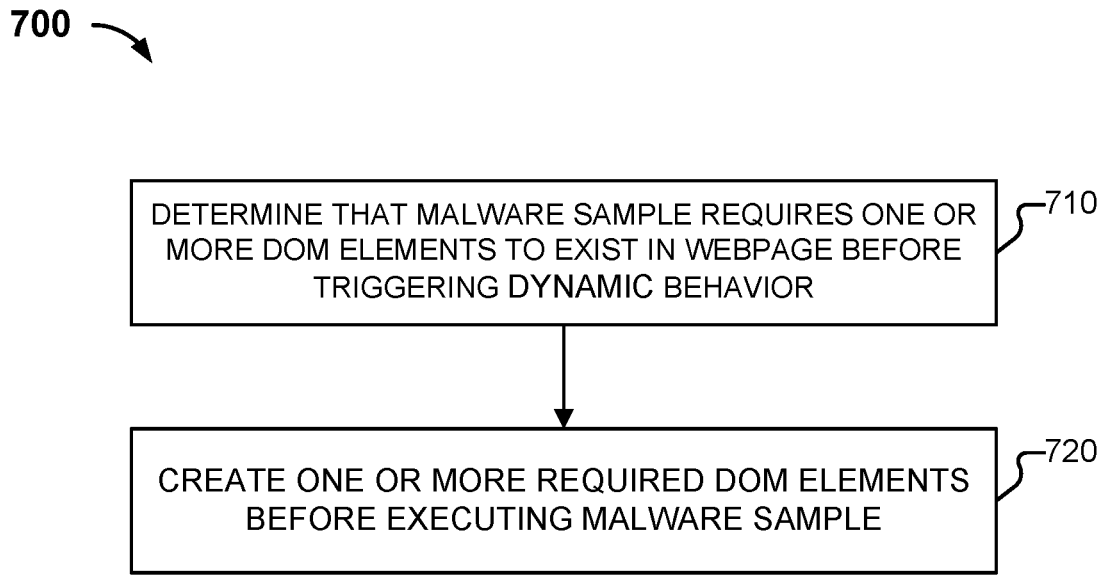
FIG. 7A illustrates an embodiment of a process for performing a Document Object Model (DOM) element check.

FIG. 7A illustrates an embodiment of a process for performing a Document Object Model (DOM) element check. In some embodiments, the process 700 is an implementation of operation 520 of FIG. 5A and includes:

In 710, the environment determines that the malware sample requires one or more DOM elements to exist in a webpage before triggering the dynamic behavior.

In 720, the environment creates the one or more required DOM elements before executing the malware sample.

As an example, the malware sample checks for the presence of an input form and a submit button. In the event that an input form and a submit button are present, the malware sample performs dynamic behaviors (e.g., steals credit card information and/or other personal information) because the malware sample is attempting to steal credit card information and/or other personal information from the user checking out of an ecommerce website.

FIG. 7B illustrates an example of JavaScript code for creating a required DOM element with class and ID.

In the example, when preparing to execute the malware sample, the environment creates the input form (e.g., payment dialog box) and the submit button with the required class and identifier (ID), so when the malware samples confirms the presence of those DOM elements, the malware sample will perform dynamic behaviors (e.g., steal credit card information).

Figure 8A:
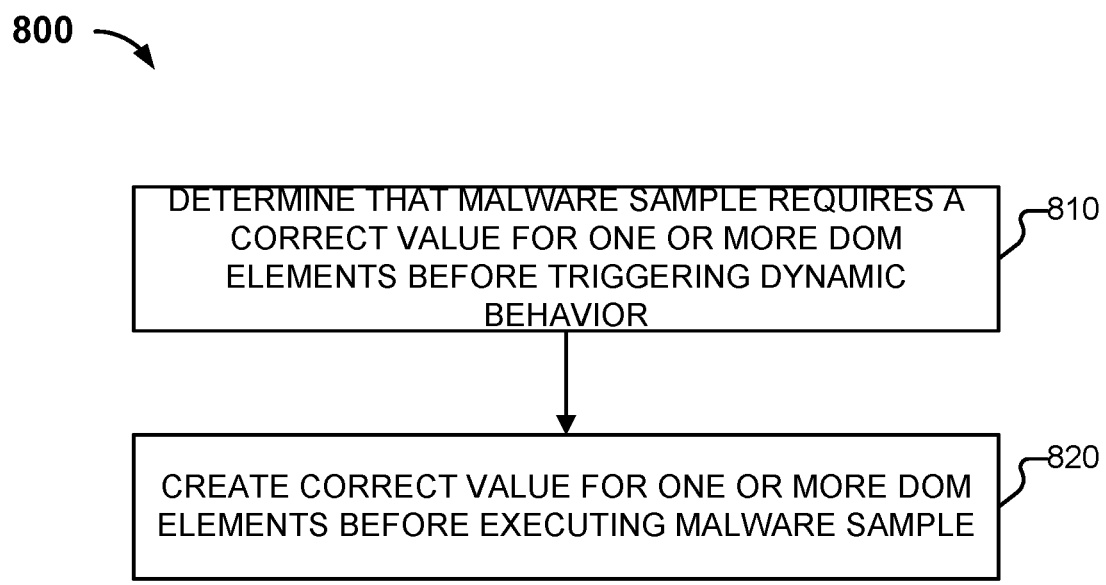
FIG. 8A illustrates an embodiment of a process for performing an input value check.

FIG. 8A illustrates an embodiment of a process for performing an input value check. In some embodiments, the process 800 is an implementation of operation 520 of FIG. 5A and includes:

In 810, the environment determines that the malware sample requires a correct value for one or more DOM elements before triggering the dynamic behavior.

In 820, the environment creates a correct value for the one or more DOM elements before executing the malware sample.

As an example, the malware sample checks correctness of an input value into a DOM element before triggering the dynamic behavior. For example, the malware sample checks that the length of the credit card number is greater than 11 digits, length of the card holder is not blank (e.g., not equal to 0 characters in length), length of the expiration date is not blank (e.g., not equal to 0 digits in length), and length of the card verification value (cvv) is greater than or equal to 3.

In some embodiments, the malware sample checks that the credit card number is valid using the Luhn algorithm.

FIG. 8B illustrates an example of JavaScript code for guaranteeing a correct value for a DOM element.

In some embodiments, when preparing to execute the malware sample, the environment guarantees a correct input value into the DOM element. For example, the environment guarantees that an input value for a credit card number is at least 10 digits, the input value for the card holder's first name and last name are not empty, the input value for the expiration date year is 4 digits, the input value for the expiration date month is 2 digits, and the input value for the cvv is 3 digits. After detecting the correct input values, the malware sample proceeds to capture the credit card information.

In another example, the environment guarantees that the input value for a credit card number is 5432123456788881, the input value for the card holder's first name is "pan," the input value for the card holder's last name is "pan," the input value for the expiration date year is "2030," the input value for the expiration date month is "12," and the input value for the cvv is "123." After detecting the correct input values, the malware sample proceeds to capture the credit card information.

Figure 9A:
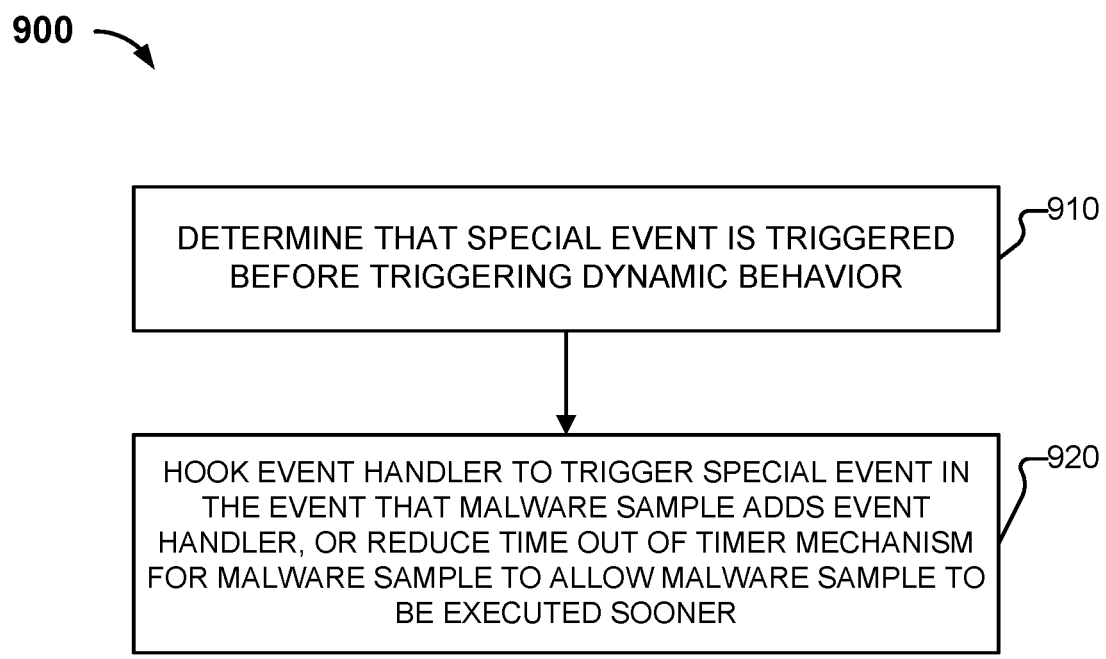
FIG. 9A illustrates an embodiment of a process for performing a special event trigger check.

FIG. 9A illustrates an embodiment of a process for performing a special event trigger check. In some embodiments, the process 900 is an implementation of operation 520 of FIG. 5A and includes:

In 910, the environment determines that a special event is triggered before triggering the dynamic behavior. In some embodiments, the special event is a timer event.

In 920, the environment actively hooks an event handler to trigger the special event in the event that the malware sample adds the event handler, or reduces a time out of a timer mechanism for the malware sample to allow the malware sample to be executed sooner before executing the malware sample.

Malware samples can add an event handler (or event listener) to a website and wait for an event to occur (for example, wait for a password to be submitted or the submit button to be clicked). After the event occurs, the malware samples can capture information such as, for example, username/password input, credit card information, or other sensitive information.

Typically, a malware sample uses a delay to periodically check whether a required element has been created on the current page. For example, some input forms are created dynamically, so not all elements are available at once. In some embodiments, the environment reduces the time out to speed up the efficiency of the malware detection.

FIG. 9B illustrates an example of JavaScript code for hooking a function and triggering an event.

In some embodiments, when preparing to execute the malware sample, the environment hooks an event handler (for example, adds a new listener on top of the event handler and sends a submit button click event) to trigger the special event in the event that the malware sample adds the event handler (the triggering occurs, for example, by sending a submit button event to the event handler). This hooking operation can allow the environment to trigger the special event by executing custom code (a function) before or after the added event handler, or instead of the added event handler, and allows the environment to trigger the dynamic behaviors of the malware sample.

FIG. 9C illustrates an example of JavaScript code for reducing a time out of a malware sample.

In some embodiments, when preparing to execute the malware sample, the environment reduces a time out to, for example, 1 millisecond, 2 milliseconds, 5 milliseconds or another small value of time of a timer mechanism of the malware sample to allow the malware sample to be executed sooner before executing the malware sample. In some embodiments, the environment directly executes the malware sample, but the malware sample can require a passed value so, in this case, directly executing the malware sample may not trigger the dynamic behaviors. In some embodiments, the malware sample executes a wait time timer before executing to, for example, periodically check if a required element has been created in the current page. However, having a large value for the waiting time value can increase the time for analysis, so by reducing the waiting time value, the time for analysis can be reduced.

In some embodiments, the timer code of the malware sample is checked to see if it has been executed before to avoid duplicate submissions of input data.

Figure 10A:
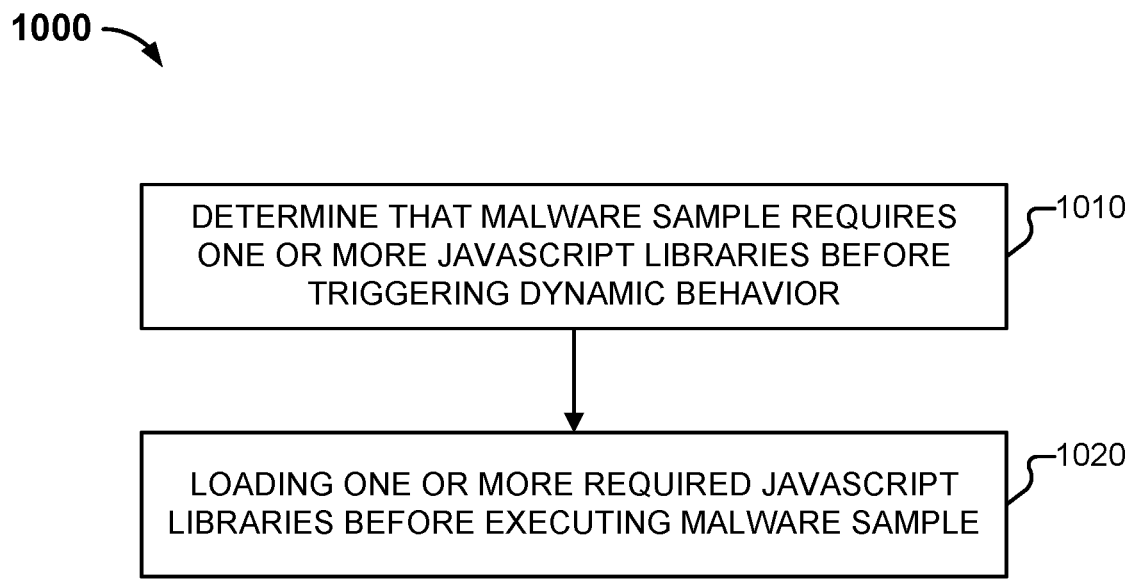
FIG. 10A illustrates an embodiment of a process for performing a library dependency check.

FIG. 10A illustrates an embodiment of a process for performing a library dependency check. In some embodiments, the process 1000 is an implementation of operation 520 of FIG. 5A and includes:

In 1010, the environment determines that the malware sample requires one or more JavaScript libraries before triggering the dynamic behavior.

In 1020, the environment loads the one or more required JavaScript libraries before executing the malware sample. In some embodiments, the environment only loads the one or more required JavaScript libraries and avoids loading any other JavaScript library.

Some malware samples require certain JavaScript libraries such as, for example, JQuery or Prototype. As an example, JQuery is required to send the collected sensitive information to a remote server via HTTP requests. Prototype is a similar to JQuery.

FIG. 10B illustrates an example of JavaScript code for loading required libraries.

In some embodiments, when preparing to execute the malware sample, not all of the common JS libraries are loaded. In some embodiments, only the necessary JS libraries are loaded such as, for example, JQuery or Prototype is loaded. Thus, when the malware sample requires JQuery or Prototype to be loaded, the malicious code can be executed successfully because the required JS libraries are loaded. In some embodiments, research is performed before executing the malware sample to identify the required JS libraries.

Conventionally, none of the required JS libraries are loaded when performing analysis, so additional behaviors cannot be observed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
execute a malware sample in an instrumented virtual environment;
identify dynamic behavior that is triggered based on user interactions; and
trigger the dynamic behavior, comprising to:
perform one or more of the following:
A) perform a uniform resource locator (URL) path check, comprising to:
determine that the malware sample requires being executed in a special URL path before triggering the dynamic behavior, wherein the special URL path includes a predefined text string; and
execute the malware sample in a customized specialized URL path that includes the predefined text string;
B) perform a Document Object Model (DOM) element check, comprising to:
determine that the malware sample checks for a presence of one or more DOM elements in a webpage before triggering the dynamic behavior, wherein the one or more DOM elements has a required class and a required identifier; and
create the one or more DOM elements before executing the malware sample, wherein the one or more DOM elements has the required class and the required identifier; and/or
C) perform an input value check, comprising to:
determine that the malware sample requires a correct value of one or more DOM elements before triggering the dynamic behavior, wherein the correct value has a predetermined number of consecutive digits; and
create the correct value having the predetermined number of consecutive digits for the one or more DOM elements before executing the malware sample; and
a memory coupled to the processor and configured to provide the processor with instructions.

2. The system of claim 1, wherein the triggering of the dynamic behavior comprises to:
perform a special event trigger, comprising to:
determine that a special event is triggered before triggering the dynamic behavior; and
hook an event handler to trigger the special event in the event that the malware sample adds the event handler before executing the malware sample.

3. The system of claim 1, wherein the triggering of the dynamic behavior comprises to:
perform a special event trigger, comprising to:
determine that a timer event is triggered before triggering the dynamic behavior; and
reduce a time out of a timer mechanism for the malware sample to allow the malware sample to be executed sooner before executing the malware sample.

4. The system of claim 1, wherein the triggering of the dynamic behavior comprises to:
perform a library dependency check, comprising to:
determine that the malware sample requires one or more javascript libraries before triggering the dynamic behavior; and
load the one or more required javascript libraries before executing the malware sample, wherein other javascript libraries are omitted from being loaded.

5. A method, comprising:
executing, using a processor, a malware sample in an instrumented virtual environment;
identifying, using the processor, dynamic behavior that is triggered based on user interactions; and
triggering, using the processor, the dynamic behavior, comprising:
performing one or more of the following:
A) performing a uniform resource locator (URL) path check, comprising:
determining that the malware sample requires being executed in a special URL path before triggering the dynamic behavior, wherein the special URL path includes a predefined text string; and
executing the malware sample in a customized specialized URL path that includes the predefined text string;
B) performing a Document Object Model (DOM) element check, comprising:
determining that the malware sample checks for a presence of one or more DOM elements in a webpage before triggering the dynamic behavior, wherein the one or more DOM elements has a required class and a required identifier; and
creating the one or more DOM elements before executing the malware sample, wherein the one or more DOM elements has the required class and the required identifier; and/or
C) performing an input value check, comprising:
determining that the malware sample requires a correct value of one or more DOM elements before triggering the dynamic behavior, wherein the correct value has a predetermined number of consecutive digits; and
creating the correct value having the predetermined number of consecutive digits for the one or more DOM elements before executing the malware sample.

6. The method of claim 5, wherein the triggering of the dynamic behavior comprises:
performing a special event trigger, comprising:
determining that a special event is triggered before triggering the dynamic behavior; and
hooking an event handler to trigger the special event in the event that the malware sample adds the event handler before executing the malware sample.

7. The method of claim 5, wherein the triggering of the dynamic behavior comprises:
performing a special event trigger, comprising:
determining that a timer event is triggered before triggering the dynamic behavior; and
reducing a time out of a timer mechanism for the malware sample to allow the malware sample to be executed sooner before executing the malware sample.

8. The method of claim 5, wherein the triggering of the dynamic behavior comprises:
performing a library dependency check, comprising:

determining that the malware sample requires one or more javascript libraries before triggering the dynamic behavior; and loading the one or more required javascript libraries before executing the malware sample, wherein other javascript libraries are omitted from being loaded.

9. A computer program product embodied in a non-transitory computer readable medium and comprising computer instructions for:

executing, using a processor, a malware sample in an instrumented virtual environment;

identifying, using the processor, dynamic behavior that is triggered based on user interactions; and triggering, using the processor, the dynamic behavior, comprising:

performing one or more of the following:

A) performing a uniform resource locator (URL) path check, comprising:

determining that the malware sample requires being executed in a special URL path before triggering the dynamic behavior, wherein the special URL path includes a predefined text string; and executing the malware sample in a customized specialized URL path that includes the predefined text string;

B) performing a Document Object Model (DOM) element check, comprising:

determining that the malware sample checks for a presence of one or more DOM elements in a webpage before triggering the dynamic behavior, wherein the one or more DOM elements has a required class and a required identifier; and creating the one or more DOM elements before executing the malware sample, wherein the one or more DOM elements has the required class and the required identifier; and/or C) performing an input value check, comprising:

determining that the malware sample requires a correct value of one or more DOM elements before triggering the dynamic behavior, wherein the correct value has a predetermined number of consecutive digits; and creating the correct value having the predetermined number of consecutive digits for the one or more DOM elements before executing the malware sample.

* * * * *